US012338881B2

(12) United States Patent
Bernardi et al.

(10) Patent No.: US 12,338,881 B2
(45) Date of Patent: Jun. 24, 2025

(54) MULTI-MOTION APPLIANCE

(71) Applicant: Robert Bosch GmbH, Stuttgart (DE)

(72) Inventors: Walter Bernardi, Highland Park, IL (US); Balazs Nagy, Roselle, IL (US); Michael Landt, Glenview, IL (US); Fulvio Camarotto, Palatine, IL (US)

(73) Assignees: Robert Bosch Tool Corporation, Mount Prospect, IL (US); Robert Bosch GmbH, Stuttgart (DE)

( * ) Notice: Subject to any disclaimer, the term of this patent is extended or adjusted under 35 U.S.C. 154(b) by 1032 days.

(21) Appl. No.: 17/360,037

(22) Filed: Jun. 28, 2021

(65) Prior Publication Data
US 2022/0010866 A1  Jan. 13, 2022

Related U.S. Application Data

(60) Provisional application No. 63/050,326, filed on Jul. 10, 2020.

(51) Int. Cl.
*B24B 37/20* (2012.01)
*A46B 13/02* (2006.01)
(Continued)

(52) U.S. Cl.
CPC ............. *F16H 37/16* (2013.01); *A46B 13/02* (2013.01); *B08B 1/12* (2024.01); *B08B 1/143* (2024.01);
(Continued)

(58) Field of Classification Search
CPC . B25F 3/00; B25F 5/001; B24B 23/03; B24B 37/20; B24B 45/006; F16H 37/16;
(Continued)

(56) References Cited

U.S. PATENT DOCUMENTS 3,231,917 A 2/1966 Reed
4,005,502 A 2/1977 Stevens
(Continued)

FOREIGN PATENT DOCUMENTS

DE   1912200 A    11/1970
DE   42 23 107 A1  1/1994
(Continued)

OTHER PUBLICATIONS

GB UK IPO Search Report.

*Primary Examiner* — Stephen F. Gerrity
*Assistant Examiner* — Linda J Hodge
(74) *Attorney, Agent, or Firm* — Kathy Takeguchi

(57) ABSTRACT

A power tool is advantageously configured to provide a rotating motion, an oscillating motion, and a reciprocating motion. The power tool includes at least one motor, which is operable to drive these three different motions at the same time. The power tool includes a rotating member, which is configured to output a rotating motion. The rotating member is configured to attach to and detach from a rotating accessory. The power tool includes an oscillating member, which is configured to output an oscillating motion. The oscillating member is configured to attach to and detach from an oscillating accessory. The power tool includes a pin, which is configured to output a reciprocating motion. The pin is configured to provide the reciprocating motion to a reciprocating accessory. The power tool is configured to provide a connected accessory with the corresponding motion during operation.

19 Claims, 10 Drawing Sheets

(51) Int. Cl.
*B08B 1/12* (2024.01)
*B08B 1/14* (2024.01)
*B08B 1/32* (2024.01)
*B24B 23/03* (2006.01)
*B25F 3/00* (2006.01)
*F16D 1/108* (2006.01)
*F16H 37/16* (2006.01)

(52) U.S. Cl.
CPC ............... *B08B 1/32* (2024.01); *B24B 23/03* (2013.01); *B24B 37/20* (2013.01); *F16D 1/108* (2013.01); *A46B 2200/30* (2013.01); *B25F 3/00* (2013.01)

(58) Field of Classification Search
CPC ........... F16D 1/108; B08B 1/32; B08B 1/143; B08B 1/12; A46B 13/02; A46B 2200/30
USPC ...................................... 173/49, 214, 29, 47
See application file for complete search history.

(56) References Cited

U.S. PATENT DOCUMENTS

| | | |
|---|---|---|
| 4,724,564 A | 2/1988 | Fresh |
| 5,423,102 A | 6/1995 | Madison |
| 5,716,263 A | 2/1998 | Jones et al. |
| 5,978,999 A | 11/1999 | deBlois et al. |
| 7,225,494 B2 | 6/2007 | Chan et al. |
| 8,109,344 B1 * | 2/2012 | Hays ................... B25F 3/00 173/171 |
| 2004/0010869 A1 | 1/2004 | Fattori et al. |
| 2004/0158944 A1 | 8/2004 | Fattori |
| 2005/0144744 A1 | 7/2005 | Thiess et al. |
| 2006/0236474 A1 | 10/2006 | Jaffe |
| 2009/0007802 A1 | 1/2009 | Taitler |
| 2013/0118767 A1 * | 5/2013 | Cannaliato ............. B25F 3/00 173/29 |
| 2013/0202401 A1 | 8/2013 | Taitler |
| 2016/0243689 A1 * | 8/2016 | Romagnoli ........... B23B 51/08 |

FOREIGN PATENT DOCUMENTS

| | | | |
|---|---|---|---|
| DE | 10 2004 050 800 A1 | 4/2006 | |
| DE | 20 2017100 736 U1 | 3/2017 | |
| DE | 202014011331 * | 6/2019 | ........... B25F 3/00 |
| EP | 3401061 A1 * | 11/2018 | ........... B25F 3/00 |
| EP | 3427900 A1 * | 1/2019 | ........... B25F 1/02 |
| FR | 2779083 | 12/1999 | |

* cited by examiner

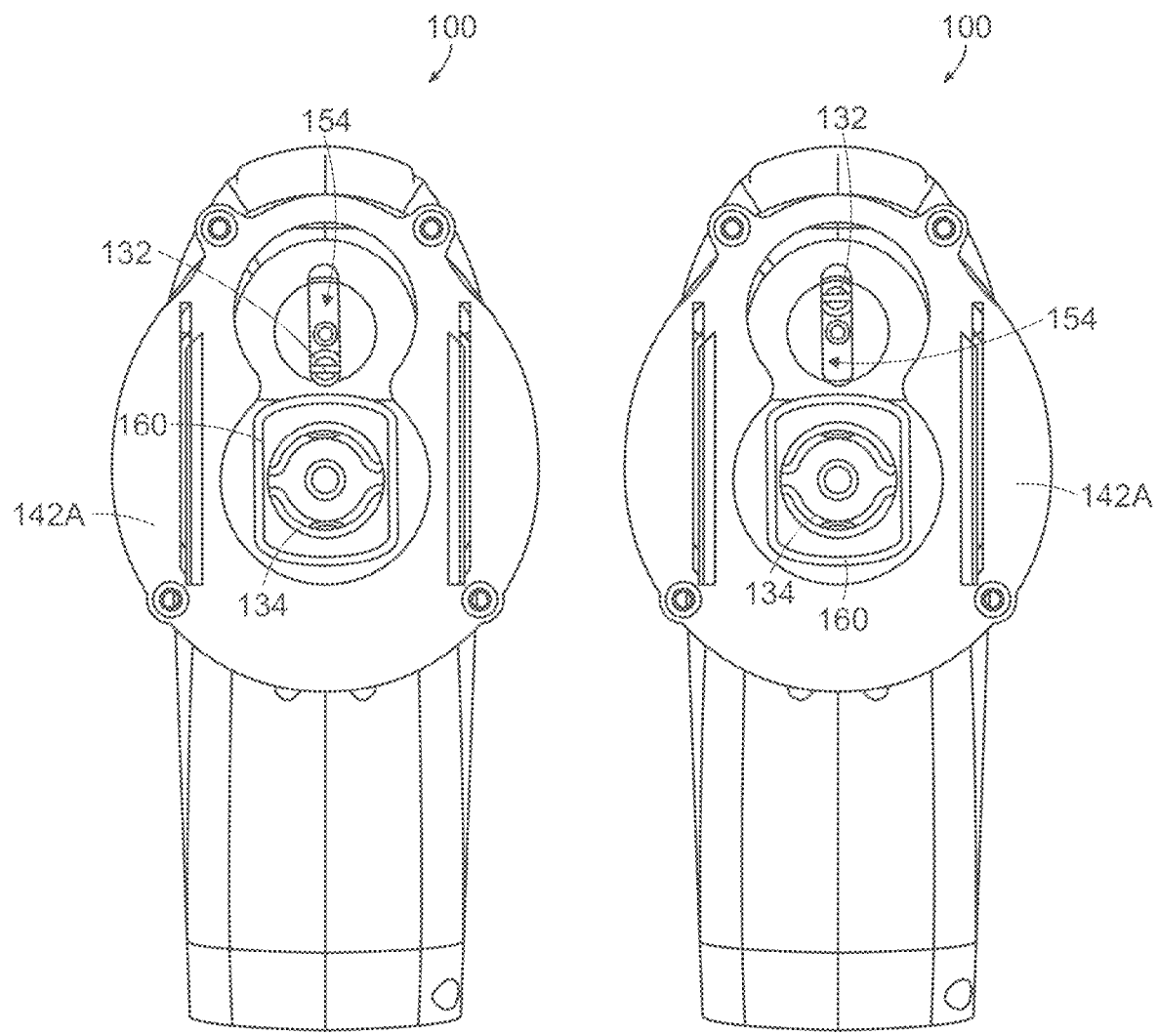

MULTI-MOTION APPLIANCE

CROSS-REFERENCE TO RELATED APPLICATION

This application claims the benefit of U.S. Provisional Application No. 63/050,326, which was filed on Jul. 10, 2020, and which is hereby incorporated herein by reference in its entirety.

FIELD

This disclosure relates generally to multi-motion appliances, and more particularly to multi-motion power tools.

BACKGROUND

In general, most motorized cleaning tools operate with rotating motions. However, these cleaning tools have a number of drawbacks, such as being limited to cleaning with only rotating motions. Although there is a motorized cleaning tool that is enabled to provide two motions, such a cleaning tool also has a number of drawbacks, such as having programmed operating modes and/or relatively complex drive mechanisms to provide these two motions.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a power tool includes at least a first shaft, a first gear, a second gear, a second shaft, a rotating member, a pin, a yoke, and an oscillating link. The first shaft is configured to be driven to rotate by a motor. The first gear is movable by the first shaft. The second gear is movable by the first gear. The second shaft is movable by the second gear. The rotating member is movable by the second shaft. The rotating member is configured to output a rotating motion. The yoke is movable by the first shaft. The yoke is configured to move the pin. The oscillating link is movable by the pin. The oscillating link has an oscillating member that is configured to output an oscillating motion.

According to at least one aspect, a power tool includes at least a driving shaft, an output shaft, a gear set, a yoke, a pin, and an oscillating link. The driving shaft is movable about a first axis when driven by a motor. The output shaft is movable about a second axis. The gear set is configured to move the output shaft as the driving shaft moves. The yoke is configured to move with the driving shaft. The pin is configured to move with the yoke. The oscillating link has a slot to receive the pin. The oscillating link is movable by the pin. The oscillating link has an oscillating member to output an oscillating motion. The pin is configured to move within the slot. The pin has a portion that extends beyond a surface of the oscillating link to output a reciprocating motion.

According to at least one aspect, a power tool includes at least a rotating member, an oscillating member, a pin, and a motor. The rotating member is configured to output a rotating motion. The rotating member is attachable to and detachable from a rotating accessory. The oscillating member is configured to output an oscillating motion. The oscillating member is attachable to and detachable from an oscillating accessory. The pin is configured to output a reciprocating motion. The pin is configured to provide the reciprocating motion to a reciprocating accessory. The motor is configured to drive the rotating member, the oscillating member, and the pin such that the rotating motion, the oscillating motion, and the reciprocating motion are output simultaneously by the power tool.

These and other features, aspects, and advantages of the present invention are discussed in the following detailed description in accordance with the accompanying drawings throughout which like characters represent similar or like parts.

BRIEF DESCRIPTION OF THE DRAWINGS

FIG. 8A is a view of a bottom side of the multi-motion appliance when the pin is at a first position within the slot of the oscillating link according to an example embodiment of this disclosure.

FIG. 8B is a view of a bottom side of the multi-motion appliance when the pin is at a second position within the slot of the oscillating link according to an example embodiment of this disclosure.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives within the spirit and scope of this disclosure.

Figure 1:
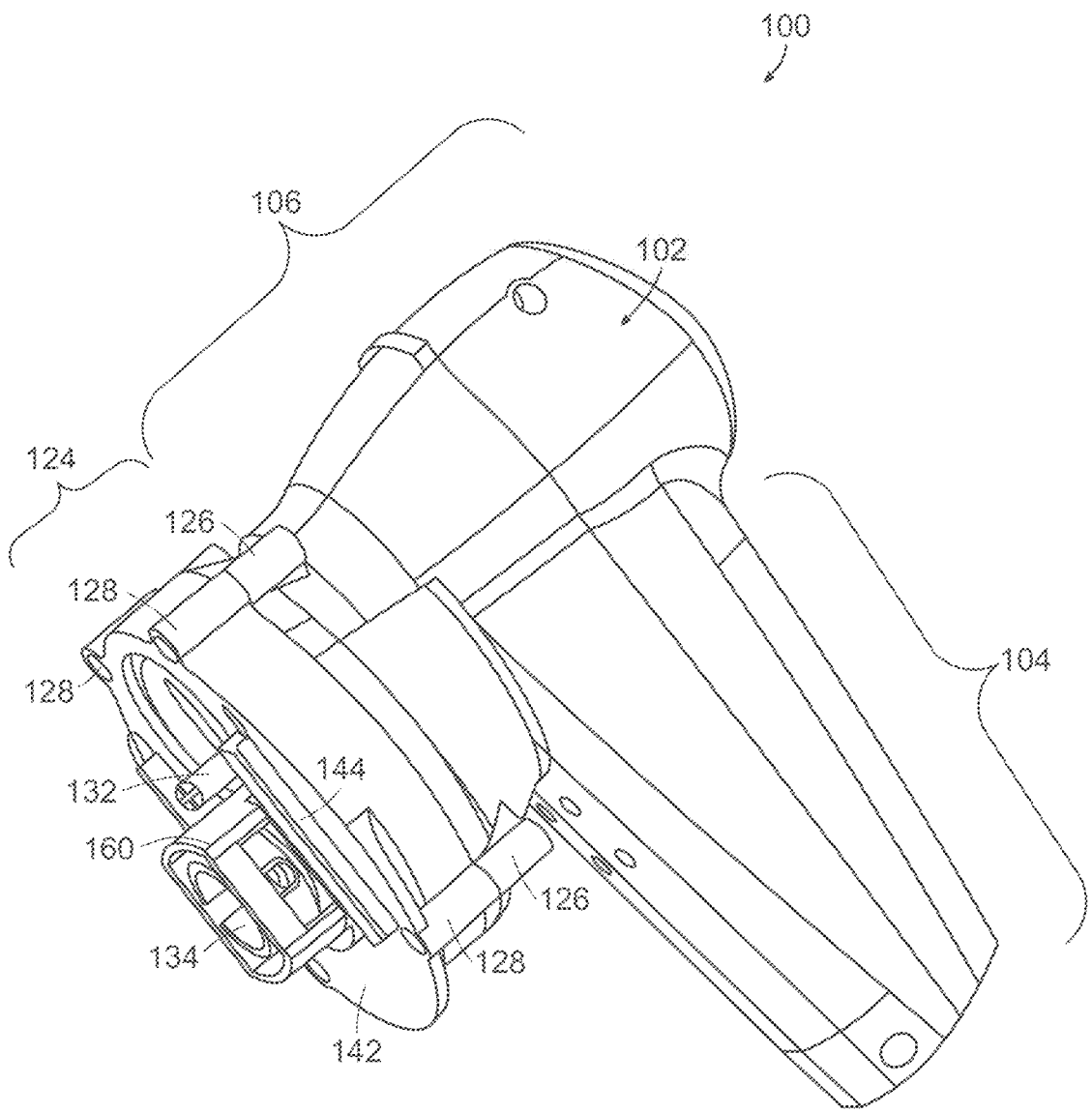
FIG. 1 is a perspective view of a side of the multi-motion appliance according to an example embodiment of this disclosure.
Figure 2:
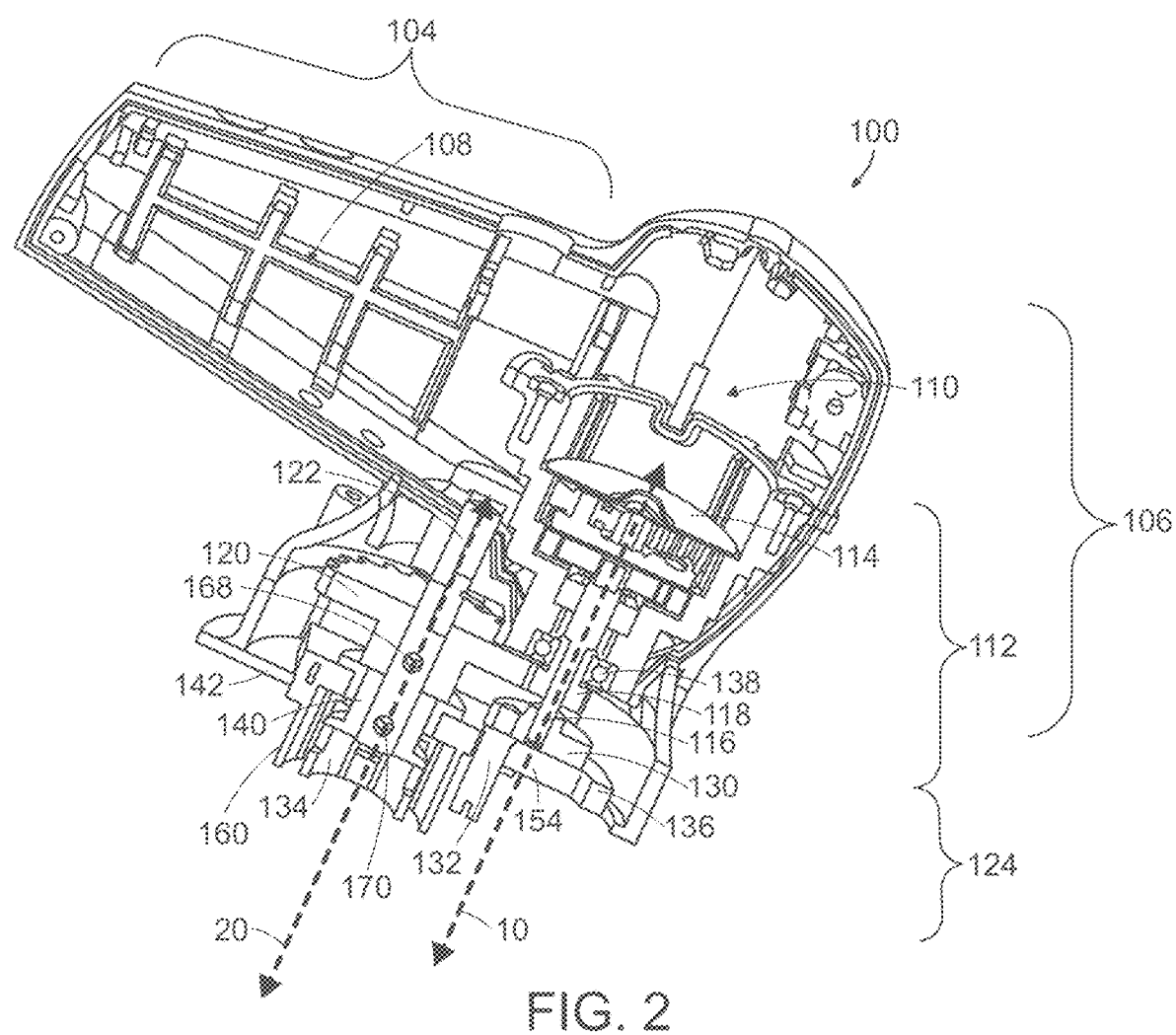
FIG. 2 is a cross-sectional view of a side of the multi-motion appliance according to an example embodiment of this disclosure.

FIGS. 1 and 2 show different views of sides of a multi-motion appliance 100 according to an example embodiment. More specifically, FIG. 1 shows a perspective view of one side of the multi-motion appliance 100 while FIG. 2 shows a cross-sectional view of an opposite side of the multi-motion appliance 100. The multi-motion appliance 100 is a portable, standalone power tool. The multi-motion appliance 100 is sized and structured to be hand-held. The multi-motion appliance 100 is configured to be cordless, connected to at least one cord, or connectable to at least one cord.

The multi-motion appliance 100 includes a housing 102, which comprises a rigid and durable material. The housing 102 is configured to house and protect a number of components. For example, the housing 102 is structured to house at least the power supply and the motor. The housing 102 is also configured to accommodate or include a power switch that enables the multi-motion appliance 100 to be switched from an off-state to an on-state and also enables the multi-motion appliance 100 to be switched from an on-state to an off-state. The power switch is operable to connect and disconnect the power supply from the motor. In addition, the housing 102 is configured to house at least a portion of a number of other components, as shown in FIG. 2.

The housing 102 includes at least a handle portion 104 and a body portion 106. The handle portion 104 enables the multi-motion appliance 100 to be hand-held. In addition, as shown in FIG. 2, the handle portion 104 includes a holding structure 108, such as a cage, cradle, ribs, or any suitable mechanism, which is configured to hold a power supply, such as at least one battery. The handle portion 104 includes a first end portion and second end portion. The first end portion is tapered towards an end portion to provide for ease of grasping and/or holding the multi-motion accessory. The second end portion is connected to and interfaces with the body portion 106 of the housing 102.

The body portion 106 is a generally elongated member. The body portion 106 extends along an axis that is perpendicular to or substantially perpendicular to the axis in which the handle portion 104 extends. The body portion 106 is structured to house the motor (not shown) along with a number of components that provide the output motions. The body portion 106 includes a first section 110, which is configured to house and support the motor. The body portion 106 also includes a second section 112, which is configured to house and support a number of components. For example, in FIG. 2, the second section 112 is configured to house and support, at least a portion of a planetary gear 114, a first shaft 116, a gear set (e.g., first gear 118 and second gear 120), and a second shaft 122. The second section 112 may also house other components, which are shown in FIG. 2 or which may be included to enhance the functionalities described herein. Also, as shown in at least FIGS. 1 and 2, the body portion 106 is connected to a gear box 124. The body portion 106 includes attachment mechanisms to enable the housing 102 to be secured to the gear box 124. For example, the body portion 106 includes a set of bosses 126 at predetermined positions along the body portion 106. The set of bosses 126 of the housing 102 align with a corresponding set of bosses 128 of the gear box 124, thereby enabling fasteners 162 to be received by the aligned bosses such that the housing 102 is secured to the gear box 124.

Figure 3:
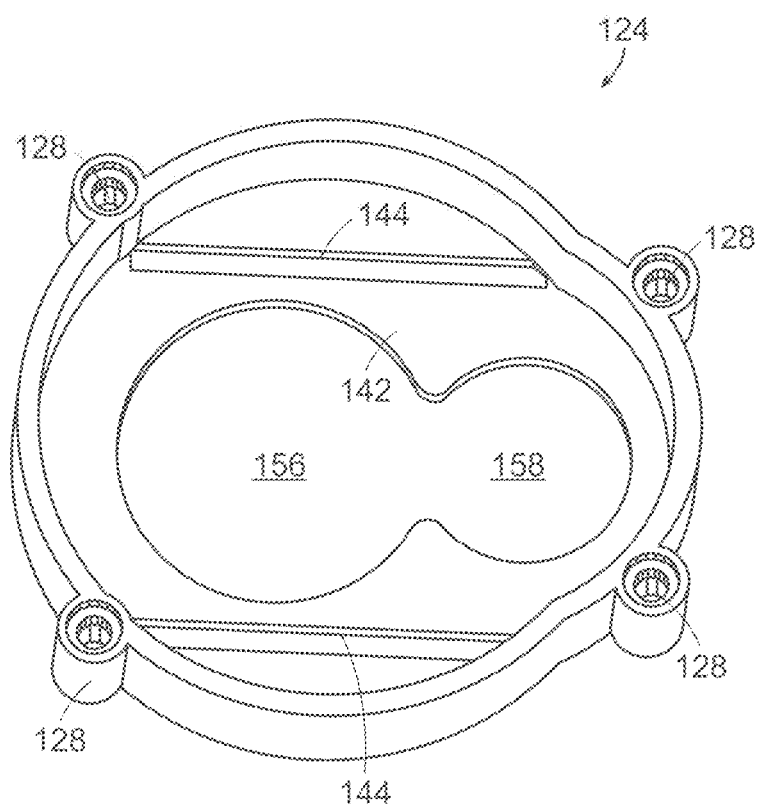
FIG. 3 is a perspective view of an example of a gear box of the multi-motion appliance according to an example embodiment of this disclosure.

FIG. 3 shows a view of the gear box 124 according to an example embodiment. The gear box 124 is configured to house a number of components that provide the output motions. For instance, as shown in FIG. 2, the gear box 124 is configured to house at least a portion of the first shaft 116, the second shaft 122, a yoke 130, a pin 132, a rotating member 134, and an oscillating link 136. The gear box 124 is also configured to house other relevant components, such as a rolling bearing 138, a bushing 140, fasteners, other mechanical devices, or any combination thereof. In addition, the gear box 124 includes at least one cover plate 142, which is configured to cover and protect the internal components of the multi-motion appliance 100. As a non-limiting example, during a cleaning operation, the cover plate 142 is configured to protect the internal components from various foreign matter (e.g., debris, dust, dirt, liquid, soap, etc.).

The cover plate 142 has an external surface 142A (FIGS. 7A and 7B), which includes guide members 144. The guide members 144 are configured to engage with and disengage from corresponding guiding connectors 146 of a reciprocating accessory 148, as shown, for example, in FIGS. 11C and 11D. For instance, in FIG. 3, the guide members 144 include parallel tracks, which are configured to receive the guiding connectors 146 of the reciprocating accessory 148. In this case, each track includes a groove with an undercut to provide a secure and movable connection with a corresponding guide connector 146 of the reciprocating accessory 148. The guiding connectors 146 include parallel guide rails, which are configured to slide or glide along the parallel grooves. The guiding connectors 146 may also include clips 146A or any suitable device, as shown, for instance, in FIGS. 11C and 11D, to ensure that the reciprocating accessory 148 stays on a linear path along the tracks/rails. The connection between the guide members 144 and the guiding connectors 146 constrains the reciprocating accessory 148 to a linear, reciprocating motion as the pin 132 pushes against sidewall portions 150 of the reciprocating accessory 148 that define a slot 152 of the reciprocating accessory 148. In addition, the oscillating link 136 (FIG. 6) includes a slot 154 that is elongated along an axis, which is perpendicular to an elongation of the slot 152 of the reciprocating accessory 148, thereby enabling the pin 132 to move along a linear path to provide the reciprocating motion to the reciprocating accessory 148. In this case, the parallel grooves are provided on the gear box 124 as they provide clearance and do not interfere with the mounting or attachment of any of the various accessories that may be connected to the multi-motion appliance 100. As an alternative arrangement, as shown, for example, in FIG. 11B, the guiding connectors 146 may be located on the gear box 124 while the guide members 144 may be located on the reciprocating accessories 148. Furthermore, the gear box 124 and the reciprocating accessories 148 are not limited to these guide members 144 and guiding connectors 146, but may include any suitable mechanisms that are enabled to provide similar functions.

Figure 9A:
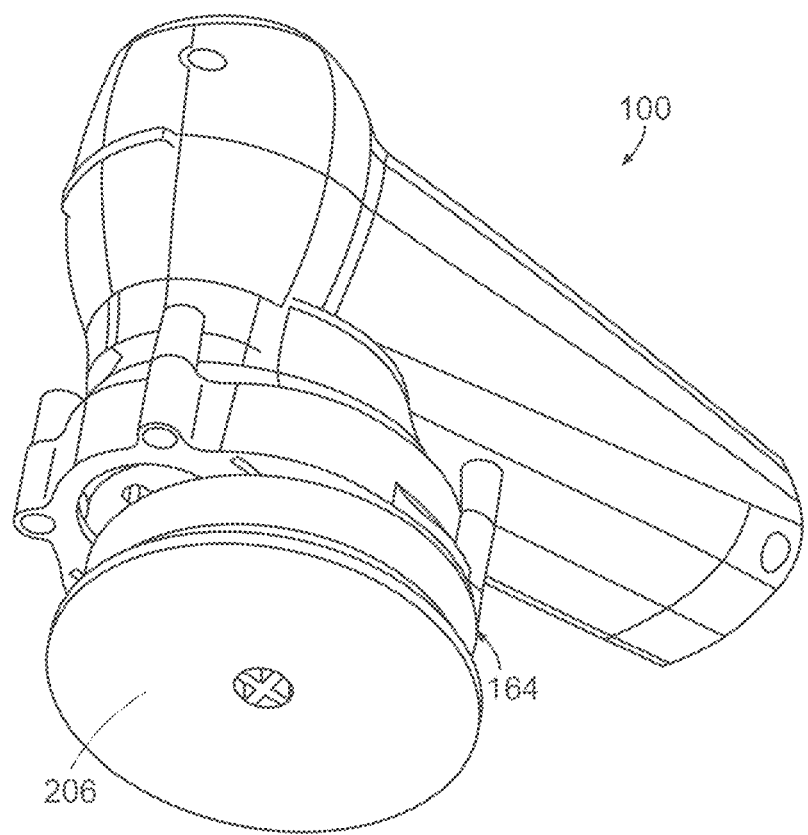
FIG. 9A is a perspective view of a side of the multi-motion appliance with an accessory that is configured to rotate according to an example embodiment of this disclosure.
Figure 9B:
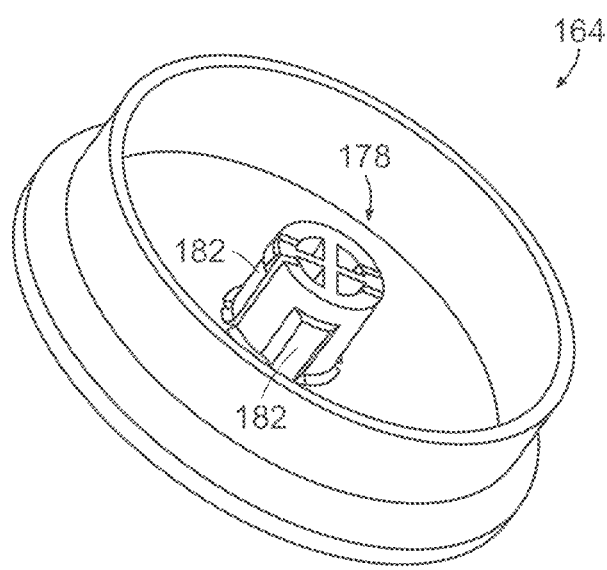
FIG. 9B is a perspective view of the accessory of FIG. 9A when detached from the multi-motion appliance according to an example embodiment of this disclosure.
Figure 10A:
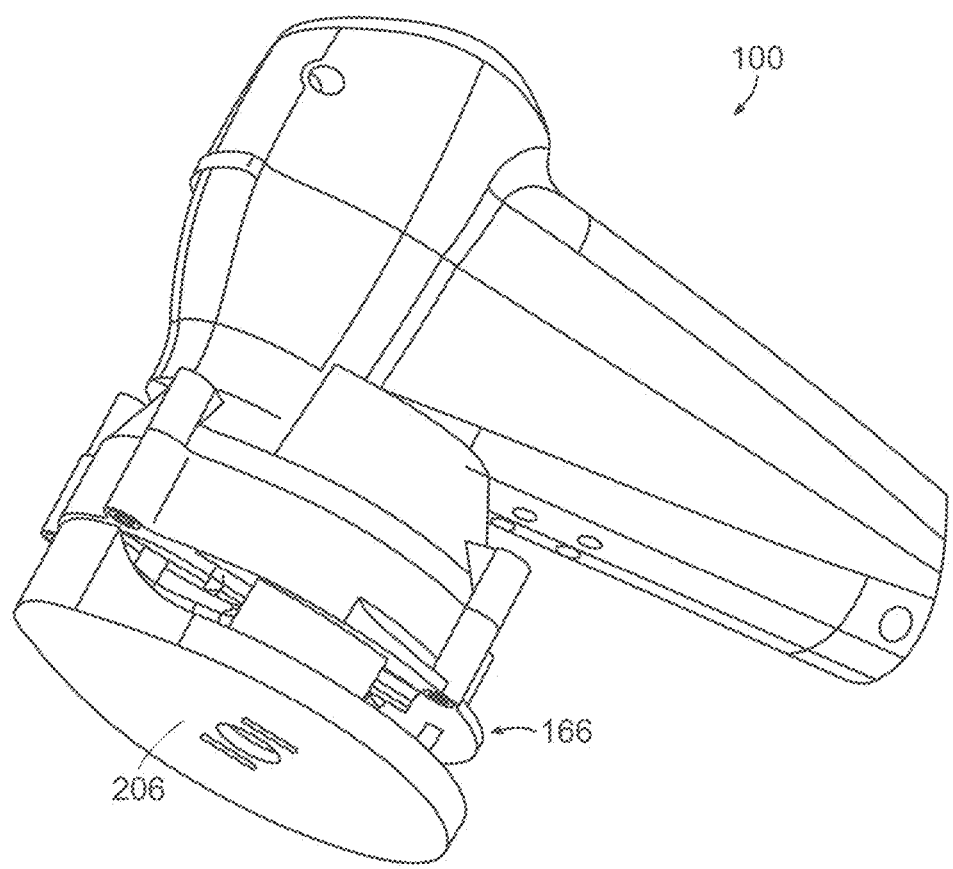
FIG. 10A is a perspective view of a side of the multi-motion appliance with an accessory that is configured to oscillate according to an example embodiment of this disclosure.
Figure 10B:
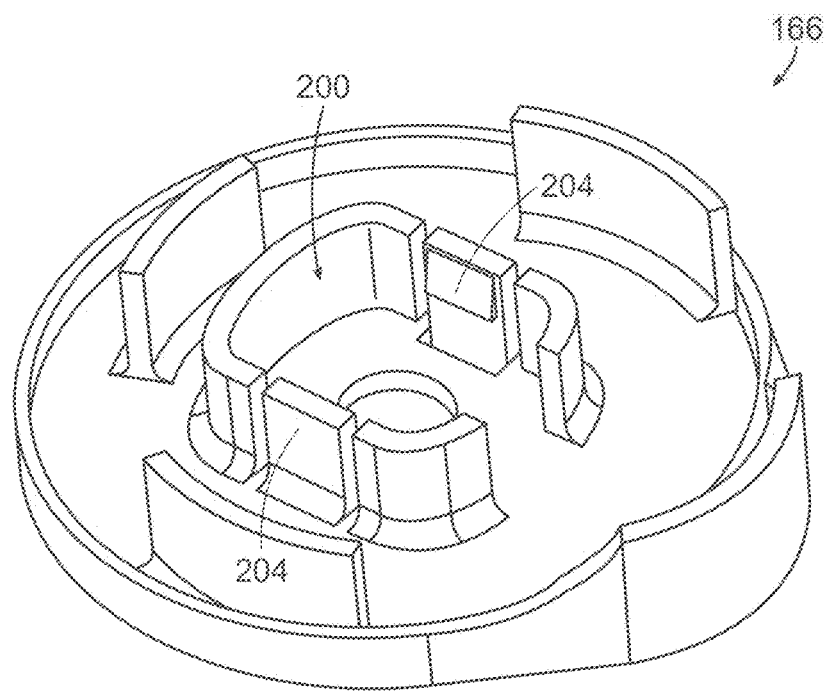
FIG. 10B is a perspective view of the accessory of FIG. 10A when detached from the multi-motion appliance according to an example embodiment of this disclosure.

The cover plate 142 includes a first through-hole 156 and a second through-hole 158, which may intersect or overlap. The rotating member 134 is configured to pass through the first through-hole 156 and extend beyond the cover plate 142 so that the rotating member 134 is accessible for connecting to and disconnecting from a rotating accessory 164 (FIGS. 9A and 9B). In addition, the oscillating link 136 includes an oscillating member 160, which is configured to pass through the first through-hole 156 and extend beyond the external surface 142A of the cover plate 142 so that the oscillating member 160 is accessible for connecting to and disconnecting from an oscillating accessory 166 (FIGS. 10A and 10B). In addition, the pin 132 is configured to pass through the second through-hole 158 and extend beyond the external surface 142A of the cover plate 142 so that the pin 132 is accessible for connecting to and disconnecting from a reciprocating accessory 148. In this regard, as discussed above, the multi-motion appliance 100 is advantageous in providing three distinct connections (e.g., rotating member 134, oscillating member 160, and pin 132) that output three distinct motions at the same time when the motor is operating. This feature is advantageous as the user simply attaches an accessory corresponding to the desired motion onto the power tool and then activates the on-state via the power switch to provide the desired motion to the attached accessory, thereby saving the user from an extra step of having to activate a particular programmed operating mode or the like that would otherwise be associated with that selected motion after attaching an accessory to the power tool.

The multi-motion appliance 100 is configured to operate on its own power supply. The multi-motion appliance 100 is configured to include a power cord to supply power to the motor and/or to recharge the power supply. For example, the multi-motion appliance 100 includes at least one battery (not shown) as its power supply. The battery includes a replaceable battery, a rechargeable battery, or a replaceable and rechargeable battery. As a non-limiting example, the battery includes a lithium ion battery, an alkaline battery, a NiCad battery, any suitable battery, or any combination thereof. The power supply is operably connected to the motor.

The motor is configured to drive a first shaft 116. For example, as shown in FIG. 2, the motor is connected to a planetary gear 114, which is configured to drive the first shaft 116 about a first axis 10. At least one speed reduction may occur within the planetary gear 114. The first shaft 116 is a driving shaft. The first shaft 116 is configured to drive a gear set such that power is transferred from the first shaft 116 to the second shaft 122. The second shaft 122 is an output shaft. The gear set includes at least a first gear 118 and a second gear 120. The first shaft 116 is configured to extend through a bore in a central region of the first gear 118. The first shaft 116 is also configured to extend through the rolling bearing 138 to reduce friction between the first shaft 116 and the first gear 118. In addition to driving the gear set, the first shaft 116 is configured to drive a slotted link mechanism, which includes at least the yoke 130, the pin 132, and the oscillating link 136. More specifically, the first shaft 116 is configured to drive the yoke 130. In this regard, when driven by the motor, the first shaft 116 simultaneously drives at least two components: the first gear 118 and the yoke 130. In FIG. 2, for instance, the first shaft 116 is press-fit onto the yoke 130 such that the yoke 130 rotates when the first shaft 116 rotates.

The gear set is configured to transfer power from the first shaft 116 ("the driving shaft") to the second shaft 122 ("the output shaft"). The gear set includes the first gear 118 and the second gear 120. The first gear 118 is connected to the first shaft 116 and configured to rotate with the first shaft 116. For example, in FIG. 2, the first gear 118 is a pinion gear, which is configured to drive the second gear 120. The second gear 120 is configured to rotate with the first gear 118. The second gear 120 is larger than the first gear 118. The second gear 120 is configured to drive the second shaft 122. A location of the second shaft 122 is offset from a location of the first shaft 116. The second shaft 122 is configured to rotate about a second axis 20. The second shaft 122 extends parallel or substantially parallel to the first shaft 116. The second axis 20 is parallel or substantially parallel to the first axis 10. In this example, the second shaft 122 is configured to rotate in one direction with the second gear 120 and not in a reverse direction.

The second shaft 122 is secured to the second gear 120 and the rotating member 134. For instance, in FIG. 2, the second shaft 122 includes a first hole 168, which is configured to receive a first locking pin. The first locking pin is configured to extend through a corresponding hole of the second gear 120 and also extend through the first hole 168 of the second shaft 122, thereby securing the second gear 120 to the second shaft 122. In addition, the second shaft 122 includes a second hole 170, which is configured to receive a second locking pin. The second locking pin is configured to extend through corresponding holes 172 of the rotating member 134 and also extend through the second hole 170 of the second shaft 122, thereby securing the second gear 120 to the second shaft 122.

Figure 4:
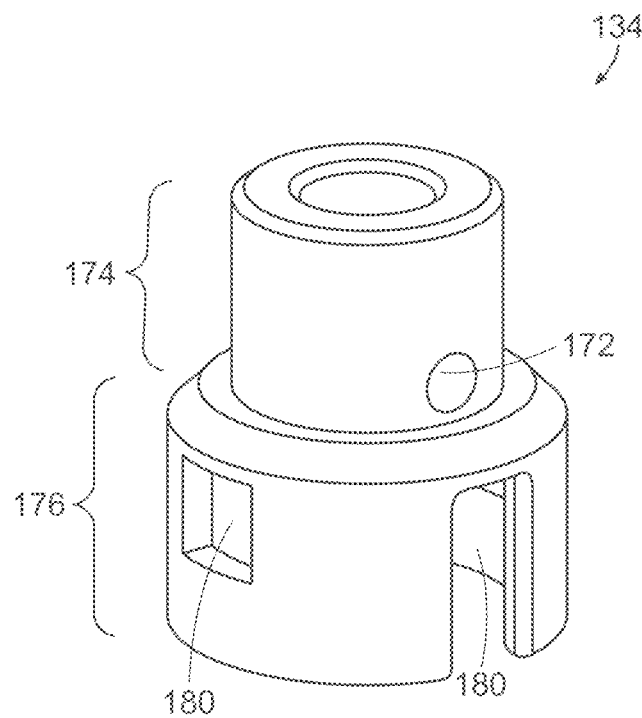
FIG. 4 is a perspective view of an example of a rotating member of the multi-motion appliance according to an example embodiment of this disclosure.

FIG. 4 shows a view of the rotating member 134 according to an example embodiment. The rotating member 134 is configured to rotate with the second shaft 122 about the second axis 20. In this example, the rotating member 134 is configured to rotate in one direction and not in the reverse direction. The rotating member 134 is configured to occur at a first speed, which is slower than the other speeds of the other motions. In an example embodiment, the oscillating motion and the reciprocating motion are performed at similar or the same speeds, which are faster than the speed of the rotating motion. The rotating member 134 includes a first portion, which includes a sleeve portion 174. The sleeve portion 174 is configured to receive a portion of the second shaft 122. The sleeve portion 174 includes at least one hole 172 to receive the second locking pin. The second locking pin is configured to extend perpendicular to a longitudinal axis of the rotating member 134. Also, the hole 172 of the sleeve portion 174 and the corresponding second hole 170 of the second shaft 122 are configured to overlap such that the second locking pin is configured to lock the rotating member 134 to the second shaft 122.

The rotating member 134 includes a second portion. The second portion includes a first type of connector 176, which is configured to connect to and disconnect from a corresponding first type of connector 178 of the rotating accessory 164. For example, in FIG. 4, the first type of connector 176 includes a socket to receive the corresponding plug of the first type of connector 178 of the rotating accessory 164. In this case, with respect to at least a radial dimension, the sleeve portion 174 is smaller than first type of connector 176. The first type of connector 176 includes various snap-fit components 180, which are configured to provide a snap-fit connection with corresponding snap-fit components 182 of the corresponding first type of connector 178 of a rotating accessory 164 (FIG. 9B).

Figure 5:
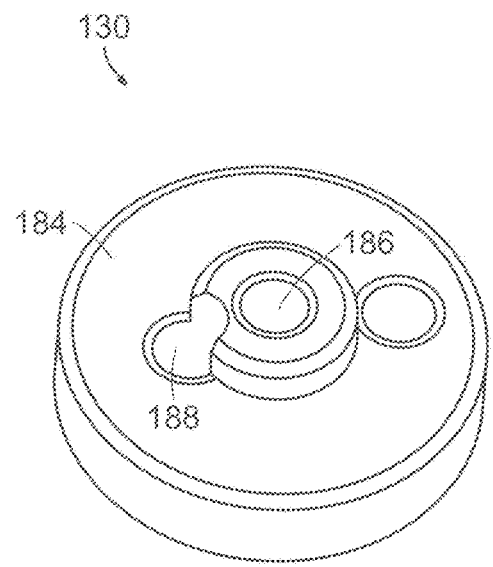
FIG. 5 is a perspective view of an example of a yoke of the multi-motion appliance according to an example embodiment of this disclosure.

FIG. 5 shows a view of the yoke 130 according to an example embodiment. The yoke 130 is configured to connect the first shaft 116 to the pin 132, thereby enabling the pin 132 to move in accordance with a movement of the first shaft 116. The yoke 130 is configured to rotate with the first shaft 116. The yoke 130 is concentric with the first shaft 116. The yoke 130 is configured to rotate about the first axis 10. For example, in FIGS. 2 and 5, the yoke 130 is a rotatable disk 184 with an opening 186 to receive the first shaft 116 and a through-hole 188 to receive the pin 132. The first shaft 116 and the pin 132 are configured to extend parallel or substantially parallel to each other when connected to the yoke 130. As shown in FIG. 5, the first shaft 116 is connected at a center region of the yoke 130 via the opening 186. For instance, in this case, the first shaft 116 has its end portion press-fit into the opening 186 of the yoke 130. The pin 132 is connected to the yoke 130 at a location that is offset from a location of the first shaft 116. The pin 132 is eccentric with respect to the yoke 130 and the first shaft 116. The pin 132 is secured to the yoke 130 via the through-hole 188 and configured to move with the yoke 130 as the yoke 130 moves with the first shaft 116.

Figure 6:
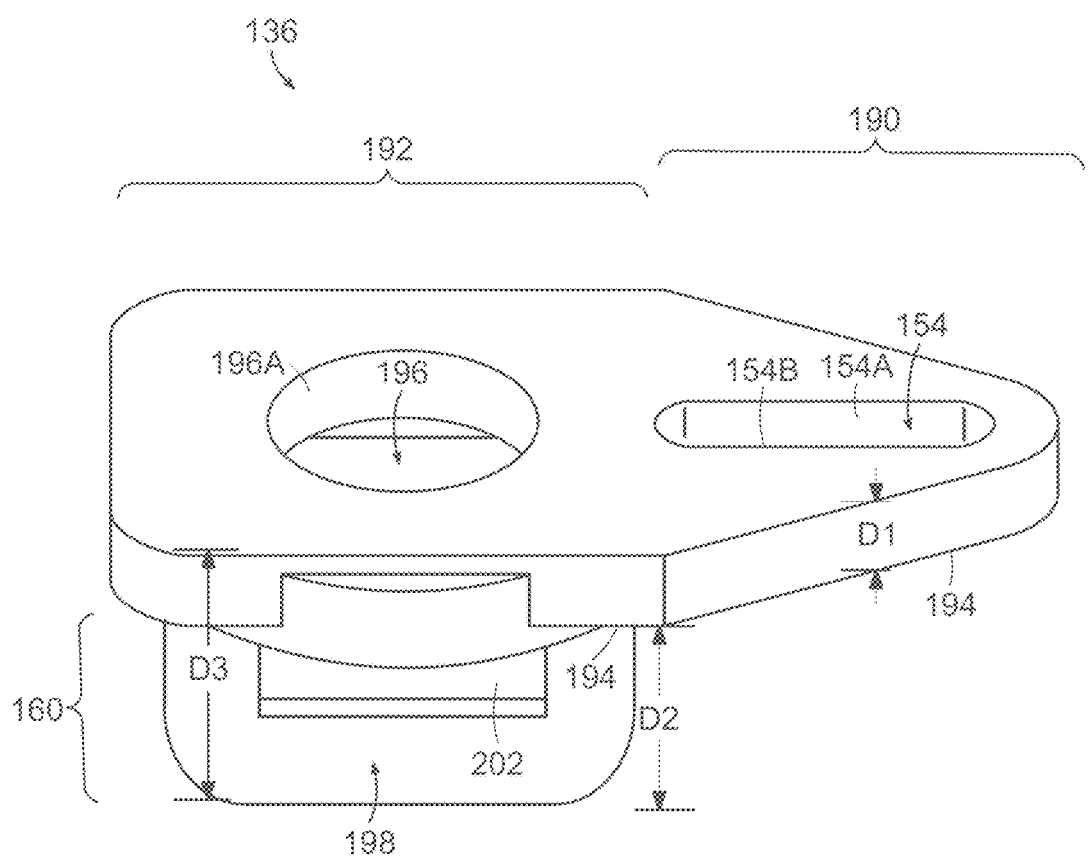
FIG. 6 is a perspective view of an example of an oscillating link of the multi-motion appliance according to an example embodiment of this disclosure.

FIG. 6 shows a view of the oscillating link 136 according to an example embodiment. The oscillating link 136 is an elongated member. The oscillating link 136 is structured to include any suitable shape that is configured to provide the functions as described herein. For example, in FIG. 6, the oscillating link 136 includes a cross-section that comprises a five-sided shape (substantially pentagonal shape) with rounded corners. Also, as shown in FIG. 6, the oscillating link 136 includes a first portion 190, which is structured to interact with the pin 132. The first portion 190 has a first dimension D1, which may extend along an axis parallel to the second axis. The oscillating link 136 includes an elongated slot 154 to receive at least a portion of the pin 132. The oscillating link 136 is movable by the pin 132. The pin 132 is configured to move the oscillating link 136 by pushing against sidewall portions 154A and 154B of the oscillating link 136 that define the slot 154. Also, the pin 132 is structured to extend through the slot 154 and beyond a surface 194 of the oscillating link 136 by a predetermined amount to be able to output a reciprocating motion to the reciprocating accessory 148. In addition, the end portion of the pin 132 is configured to protrude outward from the cover plate 142 of the gear box 124 and provide a reciprocating motion to a reciprocating accessory 148.

The oscillating link 136 includes a second portion 192. The second portion 192 includes a slot 196 to receive at least a part of the second shaft 122 and the rotating member 134. In FIG. 6, for instance, the second portion 192 includes sidewall portions 196A having a round shape in cross-section that defines a shape of the slot 196. The slot 196 is configured to receive a bushing 140, which is disposed between the sidewall portions of the slot 196 and the exterior walls of the rotating member 134. The second portion 192 further includes an oscillating member 160, which extends from the surface 194 of the oscillating link 136. The oscillating member 160 has a second dimension D2, which is greater than the first dimension D1. The oscillating member 160 has sufficient length to be able to extend out from the cover plate 142, thereby enabling the oscillating member 160 to be connectible to an oscillating accessory 166. The second portion 192 has a third dimension D3, which is greater than the first dimension D1. The third dimension D3 is a sum of the first dimension D1 and the second dimension D2. When the oscillating link 136 moves with the pin 132, the oscillating member 160 is configured to output an oscillating motion via the oscillating member 160.

Figures 7A, 7B:
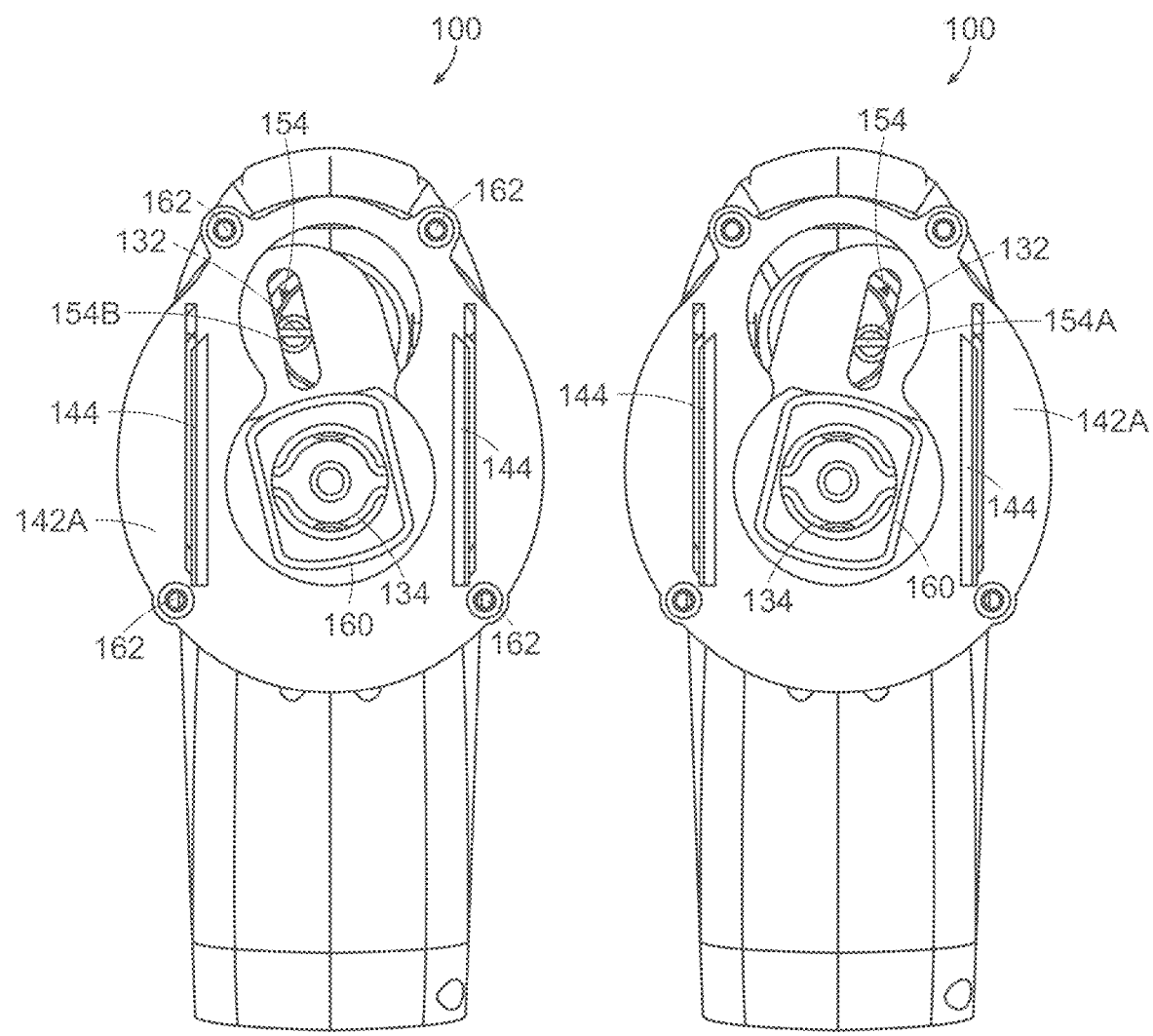
FIG. 7A is a view of a bottom side of the multi-motion appliance when the oscillating member is at one oscillating angle according to an example embodiment of this disclosure.
FIG. 7B is a view of a bottom side of the multi-motion appliance when the oscillating member is at another oscillating angle according to an example embodiment of this disclosure.

FIGS. 7A and 7B are views of a bottom side of a multi-motion appliance 100 in relation to different states of the oscillating motion according to an example embodiment. More specifically, FIG. 7A shows a view of the oscillating link 136, particularly the oscillating member 160 and the slot 154, as having rotated by a first predetermined angle with respect to the second axis 20 during an oscillating motion. In contrast, FIG. 7B shows a view of the oscillating link 136, particularly the oscillating member 160 and the slot 154, as having rotated by a second predetermined angle with respect to the second axis 20 during an oscillating motion. More specifically, when the pin 132 pushes against one sidewall portion 154B that defines the slot 154, the oscillating link 136 oscillates about the second axis 20 by an amount corresponding to and/or achieving the first predetermined angle. As another example, when the pin 132 pushes against an opposite sidewall portion 154A that defines the slot 154, the oscillating member 160 oscillates about the second axis 20 by an amount corresponding to and/or achieving the second predetermined angle. Furthermore, the oscillating member 160 is configured to provide intermediary angles, which include a range between the first angle and the second angle, as the oscillating member 160 moves between the first angle and the second angle.

The oscillating member 160 includes a second type of connector 198, which is configured to connect to and disconnect from a corresponding second type of connector 200 of an oscillating accessory 166 (FIG. 10B). For example, as shown in FIG. 6, the second type of connector 198 comprises a protruding portion. In this case, the protruding portion includes a generally four sided shape with rounded corners in plan view. The second type of connector 198 is configured to mate with a corresponding second type of connector 200 associated with the oscillating accessory 166 to provide a snap-fit connection. In this case, as shown in FIG. 10B, for instance, the second type of connector 200 includes a receiving portion that includes a generally four sided shape with rounded corners in plan view. In FIG. 6, the second type of connector 198 includes snap-fit components 202, which are configured to provide a snap connection with corresponding snap-fit components 204 of the second type of connector 200 of the oscillating accessory 166.

FIGS. 8A and 8B are views of a bottom side of a multi-motion appliance 100 in relation to the reciprocating motion according to an example embodiment. More specifically, FIG. 8A shows a view of the pin 132 at a first position with respect to the slot 154 of the oscillating link 136 during a reciprocating motion. FIG. 8B shows a view of the pin 132 at a second position with respect to the slot 154 of the oscillating link 136 during a reciprocating motion. As shown in FIGS. 8A and 8B, the first position and the second position are located at opposite end portions that define the slot 154. In this regard, the pin 132 is configured to move between the first position and the second position. The pin 132 is also configured to move to intermediary positions, which are within, between, and inclusive of the first position and the second position, as the pin 132 moves between the first position and the second position. As shown by FIGS. 8A and 8B, the pin 132 is configured to move within and along a length of the slot 154 of the oscillating link 136 to provide the reciprocating motion. Furthermore, as an example, when interacting with a reciprocating accessory 148 (FIG. 11B, 11C, or 11D), the pin 132 is also configured to push against one sidewall portion 150A that defines the slot 152 to move the reciprocating accessory 148 in the first direction while the reciprocating accessory 148 is guided linearly by the guide members 144 and guiding connectors 146 as the pin 132 moves along the length of the slot 154 of the oscillating link 136 in a first direction. As another example, when the pin 132 moves along the length of the slot 154 of the oscillating link 136 in a second direction, the pin 132 is configured to push against an opposite sidewall portion 150B that defines the slot 152 to move the reciprocating accessory 148 in the second direction while the reciprocating accessory 148 is guided linearly by the guide members 144 (and may be further guided by the guiding connectors 146).

As aforementioned, the multi-motion appliance 100 is a single, standalone power tool that is configured to generate three different motions at the same time. The multi-motion appliance 100 includes the rotating member 134 with a first type of connector 176, which is configured to connect to and rotate any rotating accessory 164. The multi-motion appliance 100 includes the oscillating member 160 with the second type of connector 198, which is configured to connect to and oscillate any oscillating accessory 166. The multi-motion appliance 100 includes the pin 132, which is configured to provide reciprocating motion to any reciprocating accessory 148 as the reciprocating accessory 148 is connected to and guided by the guide members 144 (and may be further guided by the guiding connectors 146). In this regard, the multi-motion appliance 100 is advantageously configured to connect to accessories that are customized for specific motions. The multi-motion appliance 100 is configured to connect to a single accessory (e.g., rotating accessory 164, oscillating accessory 166, or a reciprocating accessory 148) at a given time to provide a single motion to the connected accessory. Each accessory is configured to interface with the cover plate 142. In addition, each accessory is configured connect to the appropriate connector that provides the desired motion while also providing clearance for the remaining unselected connectors.

Figure 11A:
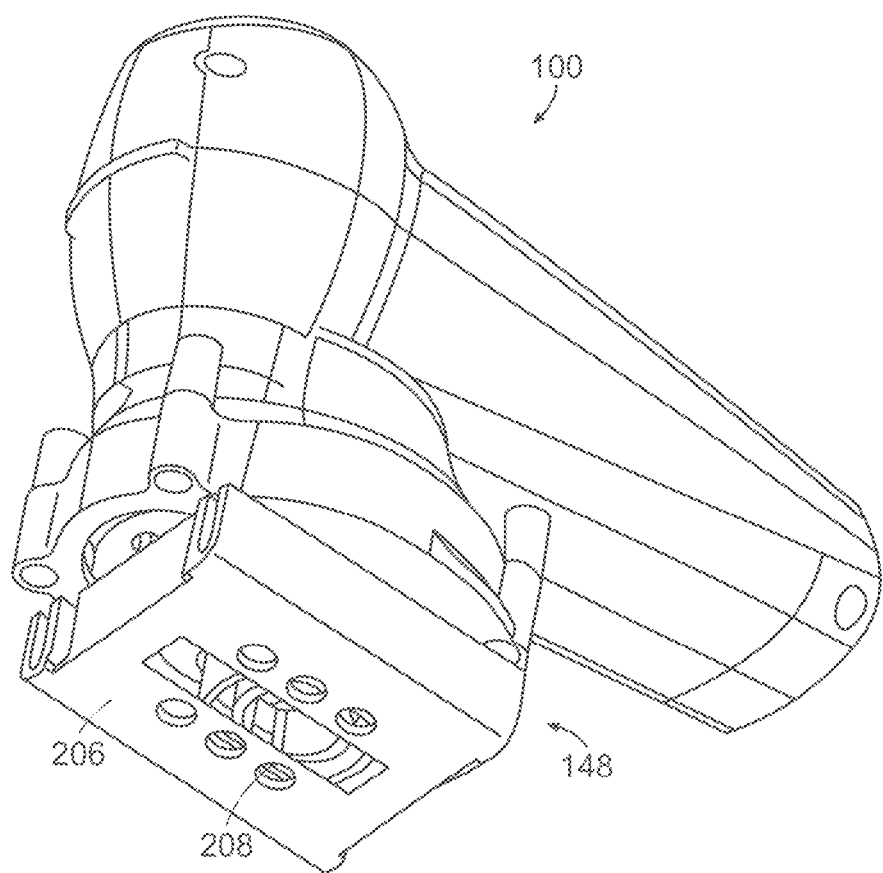
FIG. 11A is a perspective view of a side of the multi-motion appliance with an accessory that is configured to reciprocate according to an example embodiment of this disclosure.
Figure 11B:
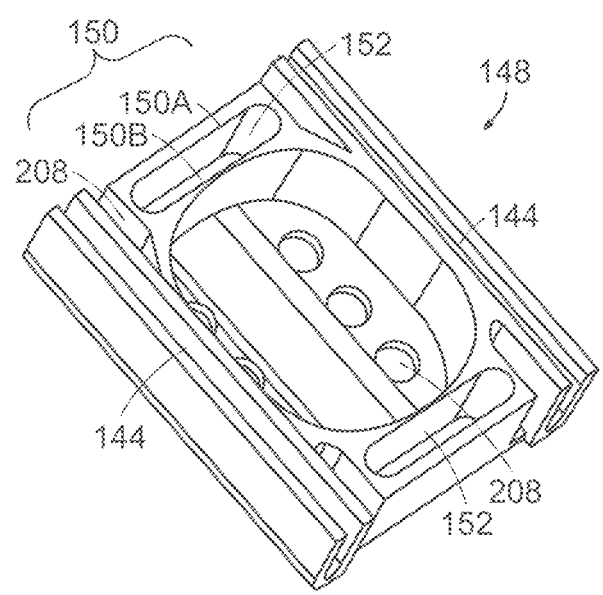
FIG. 11B is a perspective view of the accessory of FIG. 11A when detached from the multi-motion appliance according to an example embodiment of this disclosure.
Figure 11C:
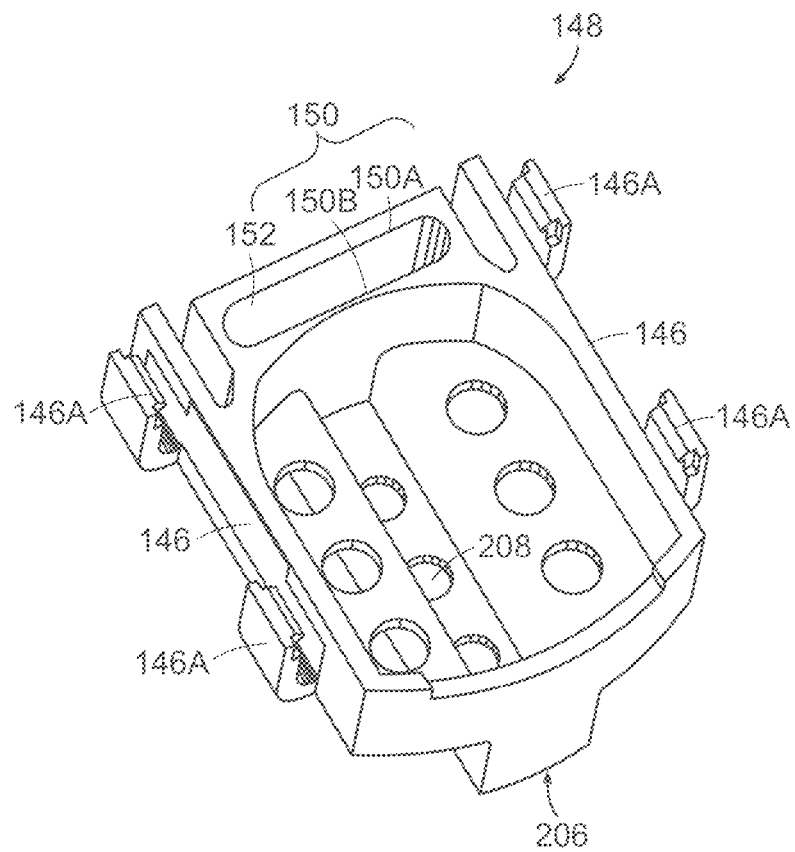
FIG. 11C is a perspective view of another example of an accessory that is configured to move in a reciprocating motion when connected to the multi-motion appliance according to an example embodiment of this disclosure.

Each accessory includes at least one surface 206, which is configured to include and support at least one attachment (not shown) if desired. The attachment is attachable or secured to the surface 206 and/or a part of the accessory via any suitable fastener or adhesive. As non-limiting examples, the attachment may include a cleaning pad, a sponge, a brush, abrasive pad, polishing cloth, any suitable material/device, or any number and combination thereof. Alternatively, the surface 206 may be used directly on a work piece if desired. Furthermore, an accessory may include a plurality of surfaces 206 to be able to contour and/or work with curved portions of work pieces. As shown in FIGS. 11A, 11B and 11C, the surface 206 may include at least one hole 208 for drainage, material savings, or the like. The surface 206 may include any suitable shape in plan view.

FIGS. 9A and 9B illustrate different views of an example of the rotating accessory 164. More specifically, FIG. 9A illustrates a view of the rotating accessory 164 when the rotating accessory 164 is secured to the multi-motion appliance 100. In this regard, when the rotating accessory 164 is connected and the power is turned-on, then the multi-motion appliance 100 is configured to rotate the rotating accessory 164 via the rotating motion that is output by the rotating member 134. In this case, the rotating accessory 164 includes a surface 206 comprising a round shape as an example. FIG. 9B illustrates a view of the rotating accessory 164 when the rotating accessory 164 is not connected to the multi-motion appliance 100. As aforementioned, the multi-motion appliance 100 is configured to connect to and disconnect from any rotating accessory 164 that includes the first type of connector 178 or any suitable connector that is connectible/compatible with the first type of connector 176. FIG. 9B also illustrates the snap-fit components 182, which are included as a part of this example of the first type of connector 178.

FIGS. 10A and 10B illustrate different views of an example of the oscillating accessory 166. More specifically, FIG. 10A illustrates a view of the oscillating accessory 166 when the oscillating accessory 166 is secured to the multi-motion appliance 100. In this regard, when the oscillating accessory 166 is connected and the power is turned-on, then the multi-motion appliance 100 is configured to oscillate the oscillating accessory 166 via the oscillating motion that is output by oscillating member 160. In this case, the oscillating accessory 166 includes a surface 206 comprising a substantially round/elliptical shape as an example. FIG. 10B illustrates a view of the oscillating accessory 166 when the oscillating accessory 166 is not connected to the multi-motion appliance 100. As aforementioned, the multi-motion appliance 100 is configured to connect to and disconnect from any oscillating accessory 166 that includes the second type of connector 200 or any suitable connector that is connectible/compatible with the second type of connector 198. FIG. 10B also illustrates the snap-fit components 204, which are included as a part of this example of the second type of connector 200.

Figure 11D:
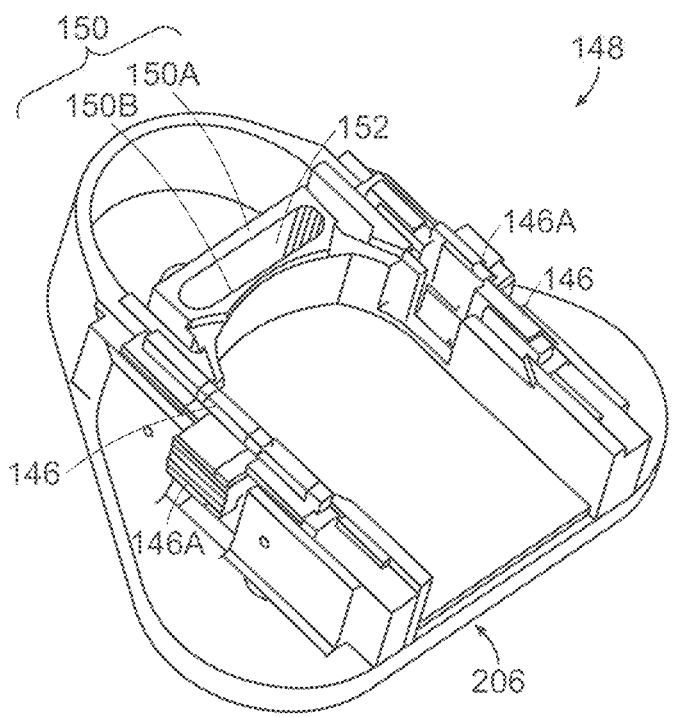
FIG. 11D is a perspective view of yet another example of an accessory that is configured to move in a reciprocating motion when connected to the multi-motion appliance according to an example embodiment of this disclosure.

FIGS. 11A, 11B, 11C, and 11D illustrate views of various examples of reciprocating accessories 148. More specifically, FIG. 11A illustrates a view of a first example of a reciprocating accessory 148 when the first example of the reciprocating accessory 148 is secured to the multi-motion appliance 100. FIG. 11B illustrates a view of the first example of the reciprocating accessory 148 when the first example of the reciprocating accessory 148 is not connected to the multi-motion appliance 100. FIG. 11C illustrates a view of a second example of the reciprocating accessory 148. FIG. 11D illustrates a view of a third example of the reciprocating accessory 148. In this regard, when any of these reciprocating accessories 148 is connected and the power is turned-on, then the multi-motion appliance 100 is configured to provide reciprocating motion to the connected reciprocating accessory 148 via the reciprocating motion that is output by the pin 132. More specifically, for example, the pin 132 is configured to push against sidewall portions 150 such that the reciprocating accessory 148 moves with the reciprocating motion. In these examples, the reciprocating accessories 148 of FIGS. 11B and 11C include a surfaces 206 comprising rectangular shapes in plan view while the reciprocating accessory 148 of FIG. 11D includes a surface 206 comprising a substantially triangular shape with rounded corners in plan view.

As discussed herein, the multi-motion appliance 100 includes a number of advantageous features, as well as benefits. For example, the multi-motion appliance 100 is a power tool, which is configured to provide at least a rotating motion, an oscillating motion, and a reciprocating motion, thereby eliminating the need to purchase three different tools to obtain these three different motions. The multi-motion appliance 100 is configured to provide at least these three different motions at the same time when the multi-motion appliance 100 is powered-on (or switched to an on-state). In addition, the multi-motion appliance 100 is advantageous in that the user is relieved from the additional burden of having to actively select a different operating mode to switch to a different motion after attaching the desired accessory and powering on the multi-motion appliance 100. As the user does not have to switch operating modes to switch to different motions, the multi-motion appliance 100 is enabled to have a simple interface (e.g. power-on switch) without needing extra buttons to activate/deactivate different motions.

In addition, the multi-motion appliance 100 is advantageously configured as a hand-held power tool, which is useful in a number of applications, such as cleaning applications or other suitable applications. The hand-held power tool is beneficial in providing three power take-offs, which operate simultaneously. For example, the hand-held power tool has (i) a first power take-off that rotates about an output axis, (ii) a second power take-off that oscillates about that same output axis in a range between at least two predetermined angles, and (iii) a third power take-off that rotates about another axis, which is offset from the drive axis, so as to provide reciprocating motion. The axes of the three power take-offs are parallel or generally parallel to one another. In addition, the hand-held power tool is configured to provide only the corresponding motion from among the three motions to the attached accessory at any given time. In this regard, for example, an accessory is configured to selectively attach to (i) the rotating member 134, (ii) the oscillating member 160, or (iii) the guide members 144/guiding connectors 146 of the cover plate 142 while engaging with the pin 132. Each accessory is configured for and dedicated to a single motion by connecting to a specific member (e.g., rotating member 134, oscillating member 160, or guide members 144 while engaging with pin 132) that performs that single motion.

Furthermore, the multi-motion appliance 100 is advantageous in enabling a user to select a particular motion for a particular application with ease, thereby providing more effective results. For example, the rotating motion is advantageous in cleaning flat surfaces. In addition, the oscillating motion may be performed with a relatively small oscillating angle, thereby enabling greater precision and control of the accessory during use. Also, the multi-motion appliance 100 tends to produce less splatter of matter, such as water, cleaning products, or the like, when the oscillating motion is applied to an accessory compared to the other motions. The multi-motion appliance 100 also tends to provide a relatively aggressive form of cleaning with less vibrations when operating with the oscillating motion compared to the reciprocating motion. Furthermore, the multi-motion appliance 100 is configured to provide a reciprocating motion to an accessory, which is advantageous in cleaning grout, joints, hard-to-reach corners, crevasses, barbeque grates, duct vents, shoes, other items, or any combination thereof.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, in other embodiments, the multi-motion appliance 100 includes a belt driving mechanism to drive the second shaft 122 (output shaft) based on or in accordance with a movement of the first shaft 116 (driving shaft). In this regard, the belt driving mechanism is used in place of the gear set (the first gear 118 and the second gear 120) to provide the same or similar functions. As another example, in other embodiments, the multi-motion appliance 100 includes a cam mechanism to provide and output the reciprocating motion to a reciprocating accessory 148. In this regard, the cam mechanism is used in place of the pin 132 and slot 154 to provide the same or similar functions. In some embodiments, the cam mechanism is configured and operable in a similar manner to a cam mechanism that provides reciprocating motion to a reciprocating saw. Furthermore, as yet another example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A power tool comprising:
   a first shaft configured to be driven to rotate by a motor;
   a first gear movable by the first shaft;
   a second gear movable by the first gear;
   a second shaft movable by the second gear;
   a rotating member movable by the second shaft, the rotating member being configured to output a rotating motion;
   a pin;
   a yoke movable by the first shaft, the yoke being configured to move the pin; and
   an oscillating link movable by the pin, the oscillating link having an oscillating member that is configured to output an oscillating motion,
   wherein,
      the oscillating link includes a slot;
      the pin is configured to move within the slot and push against sidewall portions of the oscillating link that define the slot such that the oscillating member oscillates between a first angle and a second angle; and
      the pin includes a portion that extends beyond a surface of the oscillating link to output a reciprocating motion.

2. The power tool of claim 1, wherein the rotating member outputs the rotating motion at the same time that the oscillating member outputs the oscillating motion.

3. The power tool of claim 1, wherein the rotating motion, the oscillating motion, and the reciprocating motion are output simultaneously when the motor is operating.

4. The power tool of claim 1, wherein:
the oscillating link includes another slot to receive the rotating member; and
the rotating member is rotatable within the another slot.

5. The power tool of claim 1, wherein:
the rotating member includes a sleeve portion that receives the second shaft;
the sleeve portion is secured to the second shaft by a fastener so that the rotating member moves with the second shaft; and
the rotating member includes a connecting portion with at least one connector that is configured to connect to and disconnect from a corresponding connector of a rotating accessory.

6. The power tool of claim 1, wherein:
the yoke includes a first opening to receive the first shaft at a first location of the yoke;
the yoke includes a second opening to receive the pin at a second location of the yoke;
the first location is at a center region of the yoke; and
the second location is offset from the first location.

7. The power tool of claim 1, wherein
the first shaft is movable about a first axis;
the second shaft is movable about a second axis;
the pin is offset from the first axis;
the oscillating member is rotatable about the second axis; and
the rotating member is rotatable about the second axis.

8. A power tool comprising:
a driving shaft movable about a first axis when driven by a motor;
an output shaft movable about a second axis;
a gear set that moves the output shaft as the driving shaft moves;
a yoke configured to move with the driving shaft;
a pin configured to move with the yoke; and
an oscillating link having a slot to receive the pin and being movable by the pin, the oscillating link having an oscillating member to output an oscillating motion,
wherein the pin is configured to move within the slot, the pin having a portion that extends beyond a surface of the oscillating link to output a reciprocating motion.

9. The power tool of claim 8, wherein the oscillating member outputs the oscillating motion at the same time that the pin outputs the reciprocating motion.

10. The power tool of claim 8, wherein:
the yoke is structured to receive the driving shaft at a first location of the yoke;
the yoke is structured to receive the pin at a second location of the yoke;
the first location is at a center region of the yoke; and
the second location is offset from the first location.

11. The power tool of claim 8, further comprising:
a rotating member movable by the output shaft, the rotating member being configured to output a rotating motion.

12. The power tool of claim 11, wherein:
the rotating member is configured to output the rotating motion at the same time that the oscillating member is configured to output the oscillating motion; and
the oscillating member is configured to output the oscillating motion at the same time that the pin is configured to output the reciprocating motion.

13. The power tool of claim 11, wherein:
the rotating member is attachable to and detachable from a rotating accessory;
the oscillating member is attachable to and detachable from an oscillating accessory; and
the pin is configured to provide the reciprocating motion to a reciprocating accessory.

14. The power tool of claim 13, further comprising:
a gear box having a cover plate,
wherein
the cover plate extends along a plane that is perpendicular to the first axis, and
the cover plate includes rails that guide the reciprocating accessory along a linear path.

15. A power tool comprising:
a rotating member configured to output a rotating motion, the rotating member being attachable to and detachable from a rotating accessory;
an oscillating member configured to output an oscillating motion, the oscillating member being attachable to and detachable from an oscillating accessory;
a pin configured to output a reciprocating motion, the pin being configured to provide the reciprocating motion to a reciprocating accessory;
a motor configured to drive the rotating member, the oscillating member, and the pin such that the rotating motion, the oscillating motion, and the reciprocating motion are output simultaneously by the power tool;
a driving shaft movable about a first axis when driven by the motor;
an output shaft movable about a second axis; and
a gear set configured to move the output shaft as the driving shaft moves;
wherein,
the pin is offset from the first axis;
the oscillating member is rotatable about the second axis; and
the rotating member is rotatable about the second axis.

16. The power tool of claim 15, further comprising:
a yoke configured to move the pin as the driving shaft moves,
wherein,
the yoke is structured to receive the driving shaft at a first location of the yoke;
the yoke is structured to receive the pin at a second location of the yoke;
the first location is at a center region of the yoke; and
the second location is offset from the first location.

17. The power tool of claim 15, further comprising:
a gear box having a cover plate,
wherein,
the cover plate extends along a plane that is perpendicular to first axis, and
the cover plate includes rails that guide the reciprocating accessory along a linear path.

18. The power tool of claim 15, further comprising:
an oscillating link having a slot to receive the pin,
wherein,
the oscillating member protrudes outward from the oscillating link;
the pin is configured to move within the slot and push against sidewall portions of the oscillating link that define the slot such that the oscillating member oscillates; and
the pin includes a portion that extends beyond a surface of the oscillating link and outputs the reciprocating motion.

19. The power tool of claim 18, wherein
the oscillating link includes another slot to receive the rotating member,
the rotating member is rotatable within the another slot.

\* \* \* \* \*